(12) United States Patent
Lemee et al.

(10) Patent No.: US 9,885,432 B2
(45) Date of Patent: Feb. 6, 2018

(54) DEVICE FOR CONNECTION BETWEEN A COMPONENT OF AN AIR-CONDITIONING LOOP AND A HEAT EXCHANGER

(75) Inventors: Jimmy Lemee, Saint Jean d'Asse (FR); Christophe Denoual, Noyen sur Sarthe (FR); Alain Pourmarin, La Suze sur Sarthe (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 286 days.

(21) Appl. No.: 13/810,375

(22) PCT Filed: Jul. 8, 2011

(86) PCT No.: PCT/EP2011/003411
§ 371 (c)(1),
(2), (4) Date: Apr. 19, 2013

(87) PCT Pub. No.: WO2012/007133
PCT Pub. Date: Jan. 19, 2012

(65) Prior Publication Data
US 2013/0200611 A1 Aug. 8, 2013

(30) Foreign Application Priority Data

Jul. 15, 2010 (FR) ..................................... 10 02979
Jul. 8, 2011 (EP) ................... PCT/EP2011/003411

(51) Int. Cl.
*F28D 1/02* (2006.01)
*F28D 1/00* (2006.01)
(Continued)

(52) U.S. Cl.
CPC .............. *F16L 13/02* (2013.01); *F16L 23/00* (2013.01); *F28D 9/005* (2013.01); *F28F 9/0253* (2013.01); *F28F 2280/06* (2013.01)

(58) Field of Classification Search
CPC ...... F28D 9/005; F28F 9/0253; F28F 2280/06; F16L 13/02; F16L 23/00
(Continued)

(56) References Cited

U.S. PATENT DOCUMENTS 4,081,025 A * 3/1978 Donaldson .................... 165/140
5,042,577 A * 8/1991 Suzumura ............ B23K 1/0012
165/153

(Continued)

FOREIGN PATENT DOCUMENTS

EP 0625686 A2 11/1994
EP 0762072 A2 3/1997
(Continued)

OTHER PUBLICATIONS

International Search Report for Application No. PCT/EP2011/003411 dated Aug. 30, 2011, 7 pages.

*Primary Examiner* — Grant Moubry
*Assistant Examiner* — Jason Thompson
(74) *Attorney, Agent, or Firm* — Howard & Howard Attorneys PLLC

(57) ABSTRACT

A device (4) is for connection between a component (2) of an air-conditioning loop (1) and a heat exchanger (3), including at least one channel (6.1, 6.2) through which a fluid (9.1, 9.2) can flow. The device includes an inner part (11) having at least one collar (12.1, 12.2) at least partially defining a channel (10.1, 10.2) and capable of engaging with an opening (6.1, 6.2) of the exchanger (3), and an outer part (15) mounted against the inner part (11), having at least one end piece (16.1, 16.2) at least partially defining the channel (10.1, 10.2) and capable of engaging with an opening of the component (2). The invention also relates to a heat exchanger provided with the connection device (4).

16 Claims, 5 Drawing Sheets

(51) Int. Cl.
  *F28F 3/08*   (2006.01)
  *F28F 3/00*   (2006.01)
  *F16L 13/02*  (2006.01)
  *F28D 9/00*   (2006.01)
  *F28F 9/02*   (2006.01)
  *F16L 23/00*  (2006.01)

(58) Field of Classification Search
  USPC .................... 165/78, 79, 166, 149, 176, 153
  See application file for complete search history.

(56) References Cited

U.S. PATENT DOCUMENTS

| | | | | |
|---|---|---|---|---|
| 5,826,648 | A | * | 10/1998 | Shimoya et al. ............. 165/153 |
| 5,918,664 | A | * | 7/1999 | Torigoe ........................... 165/78 |
| 5,964,281 | A | * | 10/1999 | Voss .................... F28D 1/05391 |
| | | | | 165/144 |
| 6,216,773 | B1 | * | 4/2001 | Falta .................... F28D 1/0333 |
| | | | | 165/153 |
| 8,186,719 | B2 | * | 5/2012 | Kume .................. F28D 1/0341 |
| | | | | 165/176 |
| 2006/0119099 | A1 | * | 6/2006 | Chiba .................... B21D 39/04 |
| | | | | 285/124.3 |
| 2007/0044949 | A1 | * | 3/2007 | Ohashi .......................... 165/176 |
| 2009/0236086 | A1 | * | 9/2009 | Higashiyama .......... F25B 39/02 |
| | | | | 165/176 |

FOREIGN PATENT DOCUMENTS

WO    WO 03/073022 A1    9/2003
WO    WO 03073022 A1 *   9/2003

\* cited by examiner

DEVICE FOR CONNECTION BETWEEN A COMPONENT OF AN AIR-CONDITIONING LOOP AND A HEAT EXCHANGER

RELATED APPLICATIONS

This application is the National Stage of International Patent Application No. PCT/EP2011/003411, filed on Jul. 8, 2011, which claims priority to and all the advantages of French Patent Application No. FR 10/02979, filed on Jul. 15, 2010, the contents of which are each incorporated herein by reference.

FIELD OF THE INVENTION

The present invention concerns firstly a connection device between a component of an air conditioning loop and a heat exchanger including at least one channel through which a fluid can flow.

BACKGROUND

A coolant fluid flows through a loop of this type. To this end the loop essentially comprises a compressor, a condenser (or a gas cooler), an internal heat exchanger, an expander and an evaporator, together with connecting channels between these components. The internal heat exchanger transfers heat between high-pressure and low-pressure parts of the loop, in order to improve the performance of the thermodynamic cycle (cooling power and energy efficiency).

To be more precise, the high-pressure coolant fluid coming from the compressor is cooled in the condenser, then enters a first part of the internal exchanger, and is then expanded by the expander. The low-pressure fluid obtained in this way at the outlet of the expander passes through the evaporator and then into a second part of the internal exchanger before returning to the compressor.

The internal heat exchanger generally includes a circulation channel through which a fluid flows, provided with a low-pressure fluid inlet orifice, a low-pressure fluid outlet orifice, a high-pressure fluid outlet orifice and a high-pressure fluid inlet orifice. The exchanger is thus mounted at the outlet of two of the components of the air conditioning loop: on the one hand the condenser and on the other the evaporator, with the object of cooling the high-pressure coolant fluid leaving the condenser by means of the low-pressure fluid leaving the evaporator.

In order to provide the connection between the exchanger and the aforementioned components of the air conditioning loop, a connection device is used provided with an inlet channel and an outlet channel intended to receive the low-pressure and high-pressure fluids, respectively, these channels being arranged so that, when the connection device is integrated into the air conditioning loop, they substantially face the inlet and outlet orifices of the exchanger, like the orifices of the condenser and the evaporator.

Such a connection device has the drawback of being monolithic, i.e. formed in one piece. Now, as a function of the air conditioning loop concerned, the various orifices (of the heat exchanger and the other components) to which the connection device is connected have different configurations. In particular, although the circulation channels of the exchanger generally have a standard shape, this does not apply to the orifices of the other components.

It follows that for a given configuration the whole of the prior art connection device must be adapted. In other words, this device does not allow a certain level of standardization, which cannot be satisfactory, notably in terms of fabrication costs.

Moreover, a prior art connection device is machined from a single block of aluminum, of great thickness, which is a major drawback in terms of weight in an automobile vehicle.

SUMMARY OF THE INVENTION

An object of the present invention is to remedy these drawbacks and the present invention concerns a connection device that is no longer monolithic, but produced in two different parts that are fixed one against the other and that respectively carry nozzles intended for the heat exchanger (with a standard shape) and flanges intended for the other components of the air conditioning loop (with a shape adapted to the configuration of the loop).

To this end, according to the invention, the connection device of the type defined above, that is to say between a component of an air conditioning loop and a heat exchanger including at least one channel adapted to have a fluid flow through it, is noteworthy in that it includes:
  an internal part carrying at least one flange delimiting said channel at least in part and adapted to cooperate with an orifice of said exchanger, and
  an external part, fastened against the internal part, which carries at least one nozzle delimiting said channel in part and adapted to cooperate with an orifice of said component.

Accordingly, thanks to the invention, there are provided:
  on the one hand, an internal part intended exclusively for the conformation of the inlet and outlet channels of the exchanger, the shape of which is standard, and
  on the other hand, an interchangeable external part specifically adapted to the configuration of the other components of the air conditioning loop.

These two parts, which form the connection device intended to provide the interface function between the heat exchanger and the other components, may be fastened one against the other at the time of integration of said connection device into the air conditioning loop, which ensures total flexibility of said device. Indeed, whatever the shape of the orifices of the various components, the flanges of the internal part are adapted to the standard shape of the exchanger, and it is thus necessary only to modify the nozzles carried by the external part to adapt them to the shape of said orifices.

It will be noted that the component of the air conditioning loop is fluid transport tubes or channels, or an expander.

The internal part is preferably formed of a plate the thickness of which is between 1 and 3 millimeters.

The external part is also preferably formed of a plate the thickness of which is between 1 and 3 millimeters.

Accordingly there is obtained a connection device the thickness of which is reduced, and likewise the mass, which lightens the function integrated into the vehicle.

According to one particular embodiment, at least one of the internal part or the external part is formed by drawing, which enables said parts and in particular the shape of the nozzles and flanges to be produced easily. It will be understood that drawing imposes a small part thickness in order to form the nozzles and flanges.

According to one particular embodiment, at least one of the internal part or the external part is provided with means for pre-assembly of said parts, which enables said parts to be fastened one against the other before proceeding to their final assembly.

According to one particular embodiment, the internal part and the external part are welded one against the other at the level of their respective internal faces, which enables said parts to be fixed definitively and a definitively monolithic connection block to be formed.

In this case, in order to improve the sealing of the device between the two parts during welding in a furnace, the internal face of at least one of the internal part or the external part includes a layer of solder, advantageously rolled, co-rolled or spread onto it.

According to one particular embodiment, at least one flange of the internal part has an enlargement on one surface larger than the section of the channel, which promotes the off-axis positioning of the nozzle and the flange of the same channel. This enlargement thus offers flexibility in the relative placement of the flange and the nozzle.

In this case, a flange of the internal part is preferably off-axis relative to a nozzle of the external part with which it forms a channel, which enables adaptation to the off-axis positioning of the nozzle and the flange of the same channel.

According to one particular embodiment, the internal part and the external part are partially fastened together by one of their adjacent edge surfaces, which offers the possibility of manufacturing the two parts in the same basic part, so that they are connected by one of their adjacent edge surfaces and the connection device is formed by simple bending of the two parts one on the other. It will be understood that, in such a case, the external part being fastened to the internal part, the flexibility offered by the external part is eliminated, but it is then the tool for manufacturing the parts (for example by drawing) that is adapted to produce the required shape of the external part (as well as the standard shape of the internal part) in a single step from a basic plate.

In order to facilitate the pre-assembly of the two parts and more particularly to ensure that they will not move one relative to the other before their definitive fixing, a flange of the internal part preferably has a conical shape.

In order to pre-position the connection device on the exchanger, a flange of the internal part advantageously has tongues adapted to be bent.

One or the other of these two solutions thus guarantees pre-positioning of the connection device on the heat exchanger before it enters the brazing furnace.

The present invention also concerns a heat exchanger including at least one orifice through which a fluid is admitted, noteworthy in that it is provided with a connection device according to any of the above embodiments.

BRIEF DESCRIPTION OF THE DRAWINGS

Other features and advantages of the invention will become apparent in the course of the following description given with reference to the appended drawings, which are provided by way of nonlimiting example, in which.

In these figures, identical references designate similar technical elements.

DETAILED DESCRIPTION

Figure 1:
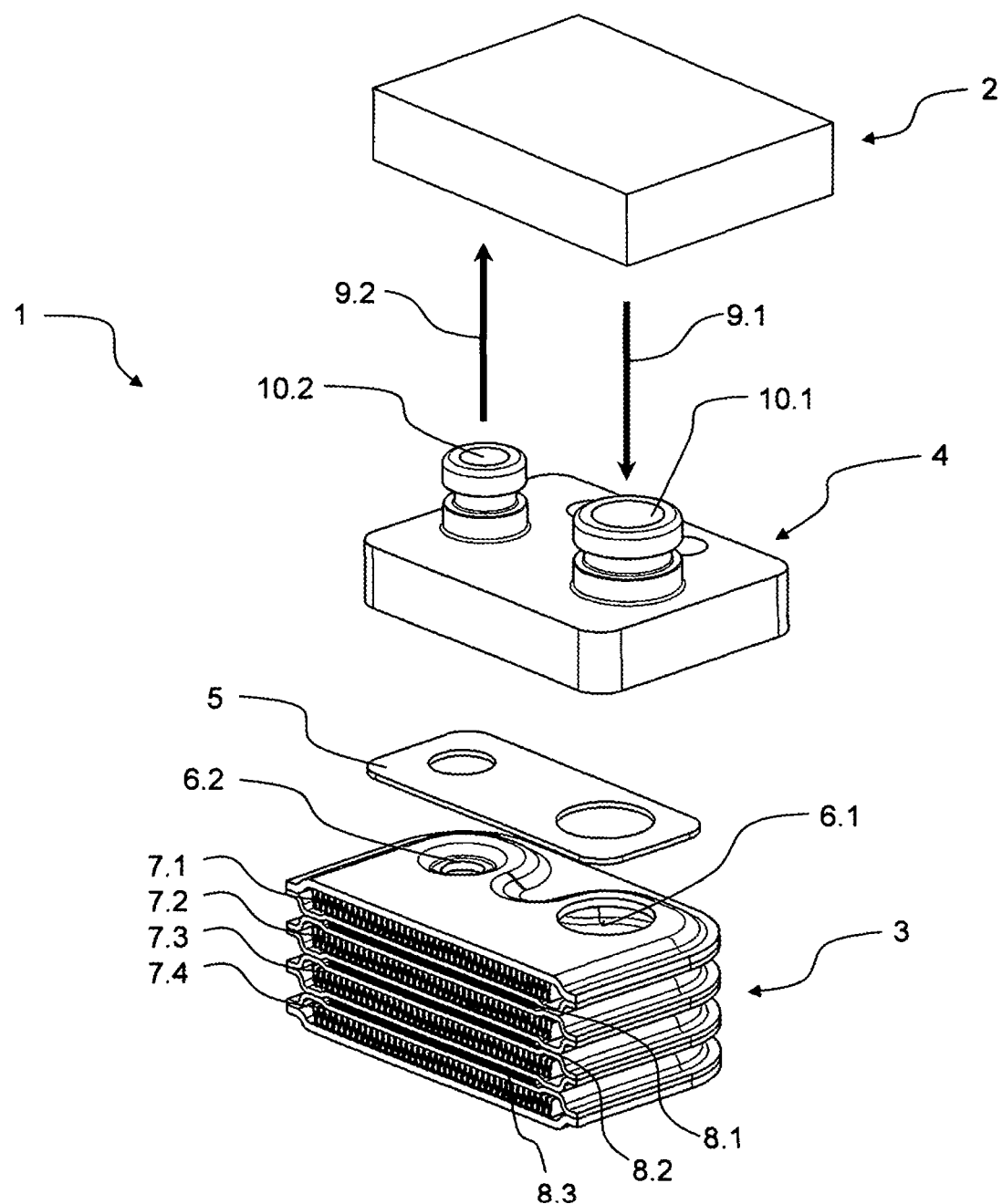
FIG. 1 is a diagrammatic view of some components of a prior art air conditioning loop.

The air conditioning loop 1 is composed of components such as, for example, a condenser, an evaporator or an expander, as well as a heat exchanger 3 on which is installed a connection device 4 between the component 2 and the exchanger 3 as shown in FIG. 1.

The heat exchanger 3 includes an outlet orifice 6.2 and an inlet orifice 6.1, as well as a set of low-pressure circulation channels 7.1, 7.2, 7.3, 7.4 and high-pressure circulation channels 8.1, 8.2, 8.3. The outlet orifice 6.2 enables outflow of a fluid 9.2 at a high pressure coming from the condenser via the outlet channel 10.2 of the connection device 4, while the inlet orifice 6.1 enables inflow of a low-pressure fluid 9.1 coming from the evaporator or from the expander, via the inlet channel 10.1 of that same device 4.

The connection device 4 from FIG. 1 corresponds to a prior art embodiment in which it takes the form of a monolithic block of aluminum in which the outlet channel 10.2 and the inlet channel 10.1 are produced. The monolithic aspect of this connection device makes it unsuitable for the standardization of air conditioning loops. Moreover it is a particularly heavy and costly part. Finally, the monolithic character of the prior art connection device does not allow the installation of a layer of solder. It is thus necessary to provide an additional component 5 and an additional fabrication step to provide the sealing function between the prior art connection device and the exchanger.

Figure 2:
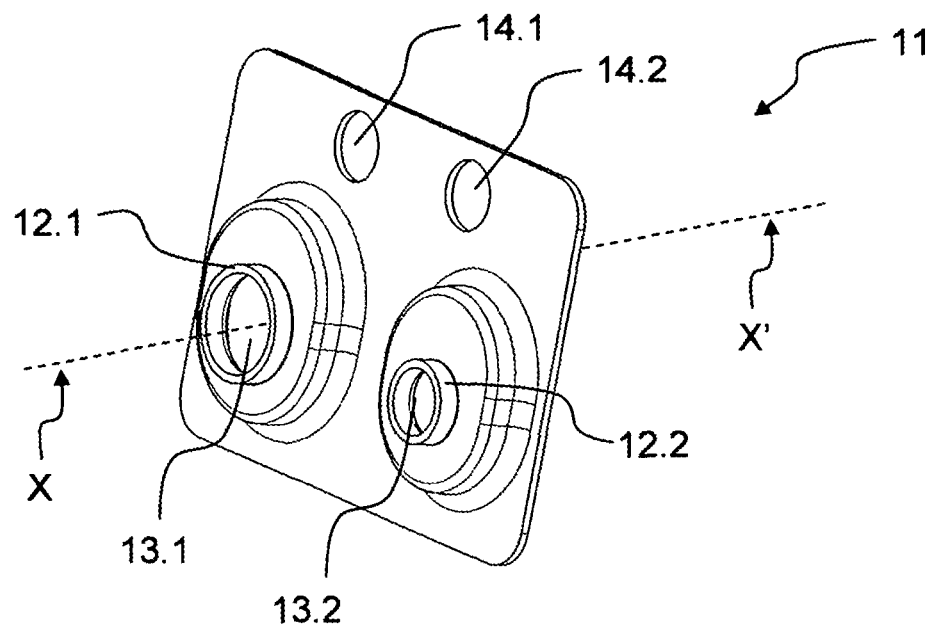
FIG. 2 is a diagrammatic view of the internal part of a connection device according to a first embodiment.
Figure 3:
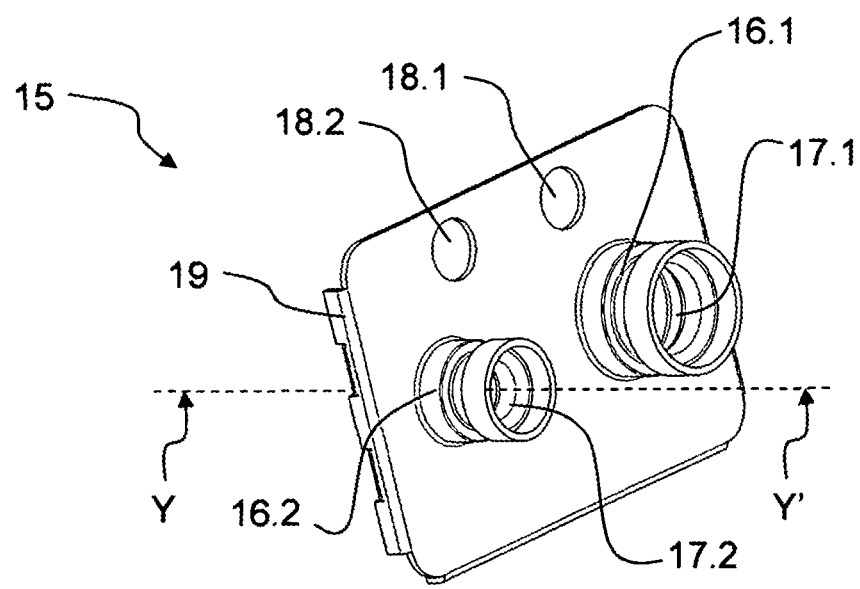
FIG. 3 is a diagrammatic view of the external part of a connection device according to this first embodiment.
Figure 4:
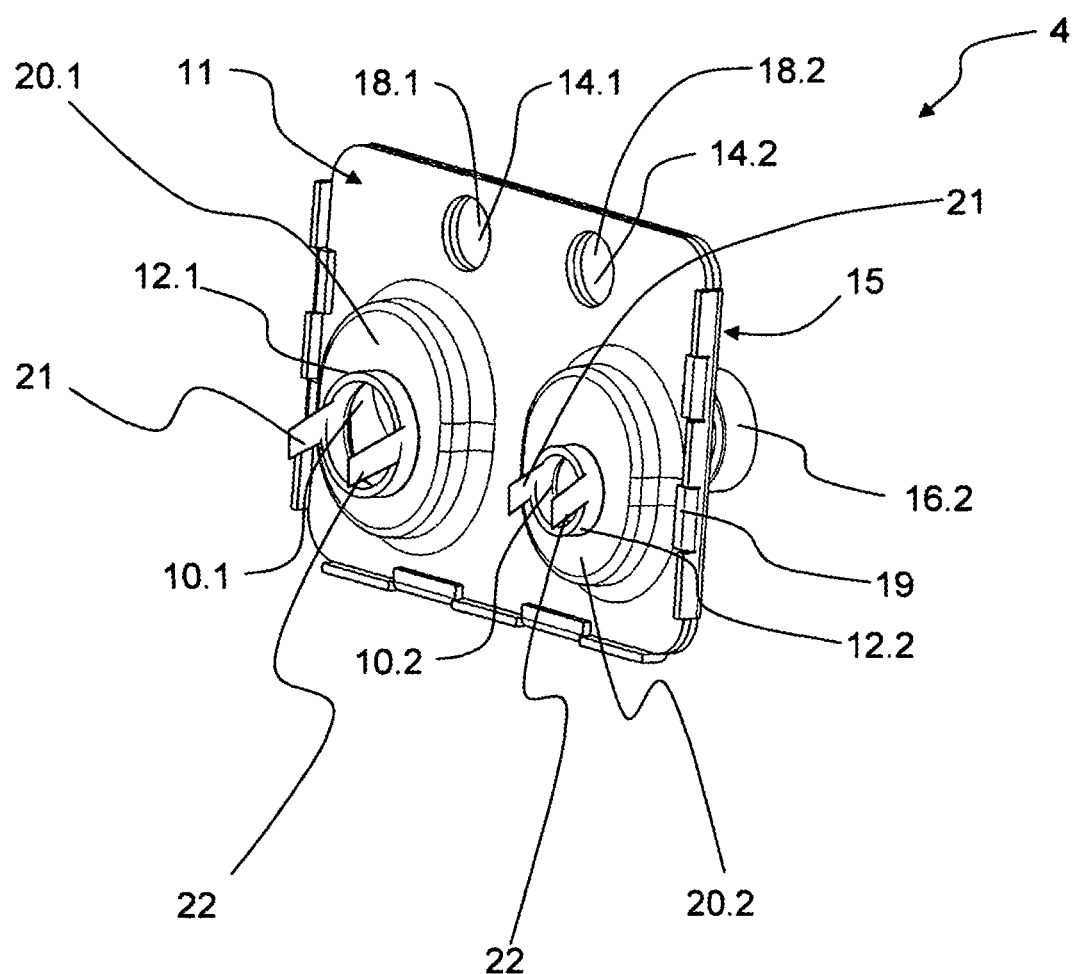
FIG. 4 is a diagrammatic view of the connection device formed by the internal and external parts from FIGS. 2 and 3.

In a first embodiment of the invention shown in FIGS. 2 to 4 the connection device 4 is formed of an internal part (FIG. 2) and an external part (FIG. 3). The terms internal and external used take by way of reference the connection device. The word internal therefore qualifies a component or a channel on the exchanger side on which the connection device is mounted and external qualifies the components or channels on the air conditioning loop side, on the opposite side of the exchanger relative to the connection device.

The internal part 11 carries two flanges 12.1 (inlet) and 12.2 (outlet) respectively forming the internal parts 13.1 and 13.2 of the outlet channel 10.2 and the inlet channel 10.1 of the connection device 4. These two flanges 12.1 and 12.2 have shapes adapted to those of the orifices 6.1 and 6.2 of the exchanger 3. In the FIG. 2 example, these flanges have a circular shape. Accordingly, the shape of these orifices being standard, the internal part 11 can equally be a standard part.

Two holes 14.1 and 14.2 are also produced in the internal part 11, these holes being intended to cooperate with identical holes formed on the external part 15.

The external part 15 carries two nozzles 16.1 (inlet) and 16.2 (outlet) respectively forming the external parts 17.1 and 17.2 of the outlet channel 10.2 and the inlet channel 10.1 of the connection device 4. These two nozzles have shapes, in particular a peripheral groove, adapted either to receive seals of components of the air conditioning loop, for example fluid transport tubes or channels, or to receive the expander. Accordingly, the external part 15 can be a part specifically designed for a particular configuration of these components (tube or expander for example).

Two holes 18.1 and 18.2 are also produced in the external part 15, these holes being identical to the holes 14.1 and 14.2 and intended to cooperate with the latter, with a view to providing a passage for screws for fixing a thermostatic expander to the connection device 4.

Peripheral pre-assembly means 19 are also disposed on three of the sides of the external part 15, for the relative positioning of the internal part 11 and the external part 15 prior to their definitive fixing one against the other. These pre-assembly means 19 can take the form of flexible elements such as tongues, or bent teeth, or alternating tongues and teeth. According to other variants, the pre-assembly means 19 can have other shapes or can be disposed on a different number of sides, provided that two opposite sides are provided with them. Alternatively, these pre-assembly means can be provided on the internal part 11 only. Alternatively, these pre-assembly means can be provided both on the internal part 11 and on the external part 15.

The internal part 11 and the external part 15 are intended to be fastened one against the other to form the connection device 4 from FIG. 4. In this case, the two parts are pre-assembled by means of the pre-assembly means 19 and they are then fixed or fastened one against the other by welding their respective internal faces, a layer of solder possibly being provided between the internal part 11 and the external part 15 in order to provide a perfect seal at the level of the connection between them. To this end, the internal wall of one of the two parts has a layer of solder rolled, co-rolled or spread onto it.

The outlet channel 10.2 and the inlet channel 10.1 are thus formed by juxtaposition of the inlet flanges and nozzles 12.1, 16.1 and the outlet flanges and nozzles 12.2, 16.2, respectively. In this regard, it will be noted that the internal wall 11 includes a first enlargement 20.1 at the level of the inlet flange 12.1 and a second enlargement 20.2 at the level of the outlet flange 12.2. Each of these enlargements forms a fluid receiving chamber so that the channels 10.1 and 10.2 can have a certain degree of off-axis positioning, the axes X-X' and Y-Y' respectively of the nozzles and flanges not coinciding after assembly of the connection device. By virtue of their surfaces that cover an area greater than that of the nozzles, these chambers formed by the enlargements 20.1 and 20.2 provide a function of absorption of the off-axis positioning following on from the flexibility in the position of the nozzles. The nozzle can thus be positioned in a customized fashion, for a standard flange, in order to adjust the off-axis positioning. This enlargement delimits an oval chamber including a bottom through which the flange is installed. The exterior dimensions of the enlargement are greater than the exterior dimensions of the flange concerned.

Once the connection device 4 has been formed in this way, it can be assembled to the exchanger 3, so that the channels 10.1 and 10.2 are disposed facing the inlet orifice 6.1 and the outlet orifice 6.2 respectively of said exchanger.

This connection device 4 therefore makes it possible to avoid the drawbacks that the monolithic prior art designs would lead to in terms of flexibility and fabrication costs, since only the external part has to be adapted as a function of the configurations of the air conditioning loop, while the internal part can be a standard part adapted to be the likewise standard shape of the exchanger.

What is more, this connection device 4 makes it possible to choose the alignment difference within the same channel as a function of the position, diameter and shape of the nozzles on the external part. Indeed, starting from a standard internal part and in order to modify this alignment difference, it suffices thanks to the invention to operate only on the positions, the shapes and the diameters of the external nozzles, and thus only on the external part.

Note that the fabrication of such internal parts 11 and external parts 15 will be evident to the person skilled in the art. They may be produced in aluminum, for example, by drawing or pressing thin plates, preferably between 1 and 3 millimeters thick. By virtue of their thinness, these plates are adapted to be stamped by a press tool to form the flanges and nozzles therein. The drawing performed on these plates may be of simple or deep type.

Tongues 21 and 22 adapted to be bent can also be disposed at the level of the free ends of the flanges 12.1 and 12.2 in order to facilitate the pre-positioning of the latter in line with the orifices 6.1 and 6.2 of the exchanger 3. These tongues 21 and 22 are bent inside the plate that receives the connection device so as to guarantee positioning of the internal part facing the exchanger and to prevent this part from moving or falling off during the step of furnace welding or brazing.

Alternatively, one of the flanges, and possibly both of them, can have a conical shape so as to be wedged into the inlet orifice 6.1 or the outlet orifice 6.2. This ensures mechanical retention of the internal part 11 on the exchanger 3 so as to guarantee pre-positioning of these elements before entry into the furnace for the brazing step.

Figure 5:
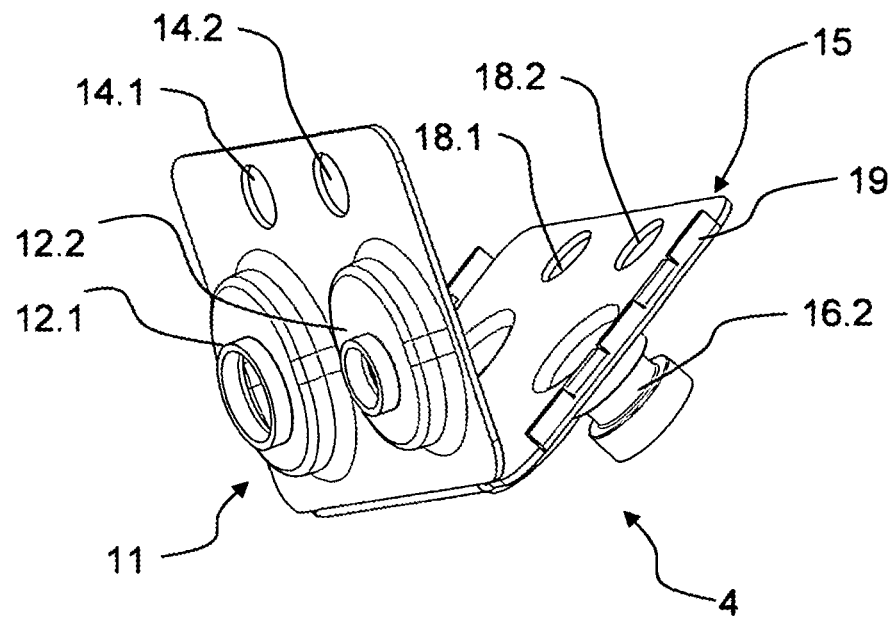
FIG. 5 is a diagrammatic view of the internal part of a connection device according to a second embodiment.
Figure 6:
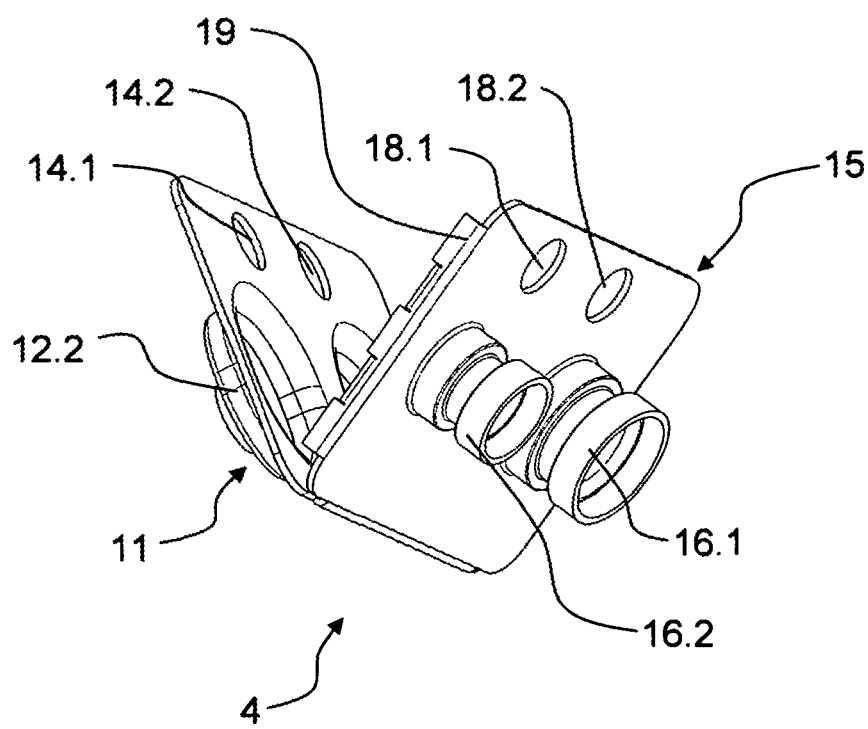
FIG. 6 is a diagrammatic view of the external part of a connection device according to this second embodiment.
Figure 7:
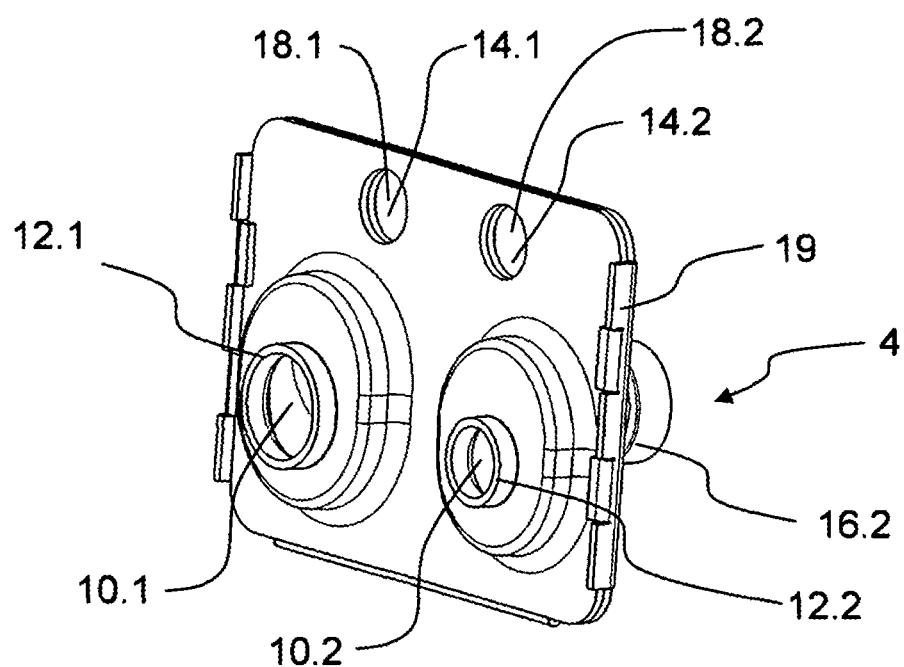
FIG. 7 is a diagrammatic view of the connection device formed by the internal and external parts from FIGS. 5 and 6.

According to a second embodiment of the connection device 4 shown in FIGS. 5 to 7 the latter device is again formed of an internal part 11 and an external part 15, but this time these are partially fastened together, and more particularly fastened together at the level of only one of their sides.

Accordingly, when the internal part 11 and the external part 15 have not yet been fastened one against the other (FIGS. 5 and 6), they are fixed to each other by their lower adjacent edge surface or side (or by another side depending on the embodiments envisaged). It then suffices to fasten the internal part 11 and the external part 15 one against the other by simple pivoting about this lower side by which they are already joined together.

Note moreover that another advantage of the present invention lies in the possibility of producing a thin connection device, for example between 1 and 3 millimeters thick (excluding the inlet and outlet channels). Indeed, for the alignment difference to be operated effectively between the two ends of each channel, it is important for this difference to be produced over a sufficient length. Now, according to an additional aspect of the invention, thin internal and external parts can be fabricated with internal and external nozzles projecting from said parts. There is therefore indeed produced an alignment difference over a great length, whilst obtaining a connection device the overall thickness of which, corresponding to the sum of the small thicknesses of the internal part and the external part, is small. Accordingly, the volume and the mass of the connection device can be significantly reduced.

The fluid described above may be for example a coolant fluid circulating in the air conditioning loop in the case where the exchanger on which the connection device is mounted is an internal heat exchanger. The scope of the invention also covers the situation in which the connection device is used for the transport of a heat-exchange fluid such as water to which glycol has been added. This is notably the case of a coolant fluid/heat-exchange fluid exchanger.

The invention has been described above for a connection device formed only of two parts fastened one against the other, but it goes without saying that the person skilled in the art will know how to adapt it in the case of a greater number of parts to be assembled to form the connection device. In particular, it is possible for example to form one of the parts from two sub-parts, each carrying one of the nozzles (inlet or outlet), these two sub-parts being then assembled to obtain the part in question.

The connection device according to the invention is particularly suitable for making the fluid connection between an internal heat exchanger and an expansion device or expander. The invention thus also covers a sub-assembly comprising an internal heat exchanger and an expander, advantageously a thermostatic expander, connected to each other by a connection device as described above.

The invention claimed is:

1. A connection device between a component of an air conditioning loop and a heat exchanger including at least one channel adapted to have a fluid flow through it, characterized in that the device includes:
   an internal part having an internal face and carrying at least one flange, the at least one flange delimiting a first portion of the channel at least in part and adapted to cooperate with an orifice of the exchanger, the at least one flange having an exterior dimension, and
   an external part having a corresponding internal face, fastened against the internal part such that the internal face of the internal part is adjacent to the corresponding internal face of the external part, the external face carrying at least one nozzle extending away from the corresponding internal face of the external part and away from the internal part, the at least one nozzle delimiting a second portion of the channel in part and adapted to cooperate with an orifice of the component, wherein the channel is formed by the juxtaposition of the at least one flange and the at least one nozzle when the external part is fastened against the internal part and includes the first portion and the second portion, wherein the first portion of the channel is axially aligned with the second portion of the channel;
   wherein the internal part has an enlargement extending away from the internal face and away from the corresponding internal face of the external part and in line with the at least one flange and positioned such that the at least one flange extends in a direction away from the external part and the internal face of the internal part relative to the enlargement when the external part is fastened against the internal part, the enlargement including a bottom through which the at least one flange is installed, wherein the bottom is distanced from a plane defined by the internal face of the internal part, the enlargement partially defining the first portion of the channel and forming a fluid receiving chamber defined between the bottom of the enlargement and the internal face of the internal part.

2. A connection device according to claim 1, wherein the internal part is formed of a plate the thickness of which is between 1 and 3 millimeters.

3. A connection device according to claim 1, wherein the external part is formed of a plate the thickness of which is between 1 and 3 millimeters.

4. A connection device according to claim 1, wherein at least one of the internal part or the external part is formed by drawing.

5. A connection device according to claim 1, wherein at least one of the internal part or the external part is provided with means for pre-assembly of the parts one against the other.

6. A connection device according to claim 1, wherein the internal part and the external part are welded one against the other at the level of their respective internal faces.

7. A connection device according to claim 1, wherein a flange of the internal part is off-axis relative to a nozzle of the external part with which it forms a channel.

8. A connection device according to claim 1, wherein the internal part and the external part are partially fastened together by one of their adjacent edge surfaces.

9. A heat exchanger including at least one orifice through which a fluid is admitted, characterized in that the heat exchanger is provided with the connection device according to claim 1.

10. A connection device according to claim 2, wherein the external part is formed of a plate the thickness of which is between 1 and 3 millimeters.

11. A connection device according to claim 1, wherein the at least one flange and the corresponding at least one nozzle are positioned such that at least a portion of the fluid flow flows directly between the at least one flange and the at least one nozzle through the channel.

12. A connection device according to claim 1, wherein the at least one flange of the internal part comprises an inlet flange and an outlet flange and wherein the at least one nozzle of the external part comprises an inlet nozzle and an outlet nozzle,
   wherein an inlet channel is formed by the juxtaposition of the inlet flange and the inlet nozzle when the external part is fastened against the internal part, and
   wherein an outlet channel is formed by the juxtaposition of the outlet flange and the outlet nozzle when the external part is fastened against the internal part.

13. A connection device according to claim 12, wherein the inlet flange and the corresponding inlet nozzle are positioned such that at least a portion of the fluid flow flows directly from the inlet flange to the inlet nozzle through the inlet channel.

14. A connection device according to claim 12, wherein the outlet flange and the corresponding outlet nozzle are positioned such that at least a portion of the fluid flow flows directly between the outlet nozzle to the outlet flange through the outlet channel.

15. A connection device according to claim 13, wherein the outlet flange and the corresponding outlet nozzle are positioned such that at least a portion of the fluid flow flows directly between the outlet nozzle to the outlet flange through the outlet channel.

16. A connection device according to claim 1, wherein the fluid receiving chamber is an oval-shaped fluid receiving chamber.

* * * * *